United States Patent [19]

zur Strassen et al.

[11] 4,165,991

[45] Aug. 28, 1979

[54] METHOD FOR THE PRODUCTION OF SYNTHETIC WOLLASTONITE MATERIAL

[75] Inventors: Heinrich zur Strassen, Schönberg; Eberhard Rauschenfels, Wiesbaden-Sonnenberg, both of Fed. Rep. of Germany

[73] Assignee: Dyckerhoff Zementwerke A.G., Wiesbaden-Amöneburg, Fed. Rep. of Germany

[21] Appl. No.: 498,643

[22] Filed: Aug. 19, 1974

Related U.S. Application Data

[62] Division of Ser. No. 241,823, Apr. 6, 1972, abandoned.

[30] Foreign Application Priority Data

Apr. 7, 1971 [DE] Fed. Rep. of Germany ....... 2116986

[51] Int. Cl.$^2$ ....................... C04B 35/04; C04B 35/06
[52] U.S. Cl. ......................................... 106/63; 106/69; 106/73.6; 106/117
[58] Field of Search ................. 106/63, 69, 73.5, 73.6, 106/51, 117, 65; 423/331

[56] References Cited

U.S. PATENT DOCUMENTS

| | | | |
|---|---|---|---|
| 2,726,963 | 12/1955 | Jackson | 106/63 |
| 2,910,760 | 11/1959 | Jackson | 106/63 |
| 3,097,954 | 7/1963 | Whitaker | 106/73.6 |
| 3,118,778 | 1/1964 | Rodis | 106/117 |
| 3,235,330 | 2/1966 | Lapple | 423/331 |
| 3,520,705 | 7/1970 | Shido | 106/46 X |
| 3,676,165 | 7/1972 | Arnoldi | 106/117 |

*Primary Examiner*—John Niebling
*Attorney, Agent, or Firm*—Weiser, Stapler & Spivak

[57] ABSTRACT

A method for the production of synthetic wollastonite material. The treatment involves slag melt which is obtained during the thermal production of phosphorous from crude phosphate. This slag is then treated with water under a preferred embodiment and burned at a certain temperature in an oxidizing atmosphere.

9 Claims, No Drawings

METHOD FOR THE PRODUCTION OF SYNTHETIC WOLLASTONITE MATERIAL

This is a division of application Ser. No. 241,823 filed Apr. 6, 1972, now abandoned.

This invention relates to the production and use of synthetic wollastonite material which may be purified and modified by additives.

Natural wollastonite, B—$CaSiO_3$, occurs as contact mineral in contact zones between limestone and quartz. The only large deposit which also supplies a very pure and white material, is located in the United States. After the advantageous properties of the wollastonite for ceramic purposes were recognized, one attempted to synthesize it in countries which did not possess the raw material. Besides the melting of suitable raw materials and subsequent crystallization, the production by means of hydrothermally prepared calcium hydrosilicates has also become known. In the latter case, products are obtained which even excel natural wollastonite in their whiteness.

Even though one succeeds in producing high quality material, the known methods of production are still too expensive for commercial use of the excellent properties of wollastonite in the ceramic industry. Therefore, the object of the present invention is to discover a rational method for the production of a synthetic wollastonite which is equivalent to the known products.

In the electrothermal production of phosphorus, crude phosphate (apatite) is reduced by carbon under simultaneous combination of nascent CaO, with silica. Starting from fluoroapatite, the equation for the reaction is as follows:

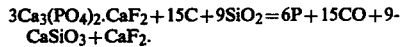

$$3Ca_3(PO_4)_2 \cdot CaF_2 + 15C + 9SiO_2 = 6P + 15CO + 9CaSiO_3 + CaF_2.$$

Phosphorus and carbon dioxide escape as gas. The remaining components are collected in the slag together with residue of the starting material and impurities from the other products with the exception of iron, which as ferrophosphorus, forms a second melting phase in the slag melt. Hence, the silicate-containing phase of the slag has the chemical composition of a wollastonite which is poor in iron and impure by reason of different foreign components, particularly ferrophosphorus. It is the object of the present invention to substantially shorten the method of production of wollastonite by utilizing this slag wherein the chemical combination of the components CaO and $SiO_2$ has already taken place.

The silicate slag melt is poured out after tapping and solidifies as lump slag. In this condition, it has an ugly grey color and so far has been dumped as waste or utilized as cheap fill in underground engineering together with sand or gravel. Until now, starting from this lump slag, it was not possible to obtain a wollastonite material meeting, for example, the requirements of the ceramic industry. In contrast to that, the following result is achieved by the invention. The melt is quenched in water in a matter known per se, and the resulting glassy slag sand, after eventual removal of impurities and addition of modifying substances, is subsequently burned at temperatures of about 1100° C.—preferably at 1150° to 1200° C.—in an oxidizing atmosphere, specifically, in a rotary kiln until the color of the material is changed and a crystalline, eventually modified wollastonite material is formed. The correct operating condition of the rotary kiln can be easily recognized by the clear color change as a result of the exact regulation of the burning temperature and residence time.

With the optimum burning temperature, the end product is a light, easily ground and—after removal of impurities—pure white, gritty wollastonite material. The iron content is, therefore, surprisingly low, e.g., it amounted to 0.06% of $Fe_2O_3$ in one sample. In case of a powder ground to a fineness of 4000 $cm^2$/g, a brightness reference value Y of 94 was measured, with MgO=100. The whiteness quality of the product is equivalent to the best synthetic wollastonite and substantially better than the natural mineral.

If no pure white, high quality material is desired, one can dispense with the quantitative separation of the coloring impurities. These then form clearly visible black granules in the burned product although they are hardly recognizable in the initial slag, occuring as tiny grey particles in the grey basic mass. The discoloration takes place at increased temperature by reaction of these tiny particles with the silicate under oxidation. A wollastonite material having a $Fe_2O_3$—content of 0.13% which originated mainly from such impurities exhibited a light cream color and a brightness reference value of Y=88 after grinding to 4000 $cm^2$/g. The white content was still higher than that of natural wollastonite.

According to a further embodiment of the invention, prior to the burning to wollastonite material, modifying substances containing particularly $Al_2O_3$ and/or $SiO_2$ and/or alkali metal oxides, which during burning with the granulated slag react to form a modified wollastonite material whereby the additives are present in homogeneous distribution, are added to the purified or unpurified phosphorus slag which was quenched in water.

The process for producing the wollastonite material from the granulated phosphorus slag can be substantially simplified by the addition of the modifying substances. For example, the granulated phosphorus slag which is mixed with the additives is molded and after drying at temperatures of about 1050° C.—preferably 1150° to 1250° C.—is burned in a suitable furnace until the material turns in color and is simultaneously completely sintered. If desired, prior to burning, ceramic dyes known per se containing coloring oxides can also be added for coloring enamels and glassware. In this manner one obtains a chromatic pure, colored modified wollastonite material preventing other than the desired color variations from taking place during the burning.

It was discovered that the reaction of the phosphorus slag proceeds in a particularly advantageous manner if the quantity of the $Al_2O_3$—containing substances, calculated as $Al_2O_3$, amounts to 1 to 15% by weight. Likewise, additive quantities of 2 to 30% by weight of the $SiO_2$—containing substances, calculated as $SiO_2$, and of 0.5 to 10% by weight of the alkali metal oxides-containing substances, calculated as alkali metal oxide, are also suitable. The above-mentioned quantitative data relate to the slag part of the mixture. In the burned product, mainly the X-ray analysis of wollastonite was carried out and in some cases anorthite could also be determined.

It is self-evident that in the respective modifying coloring substances, added according to the process of the invention, the components to be incorporated are not necessarily present as oxides. The statement used within the scope of the present invention, i.e. that the respective modifying, coloring components contained in the additive substances are present in the form of their oxides, was merely used because of the method, usual in the ceramic field, for calculating the co-reactants to be incorporated. Accordingly, the additive substance can in any case be, e.g., a solution or a salt of the corresponding component. Only the formation of the desired reactive oxides of the components during the burning is relevant.

The production of the modified wollastonite material is evidenced by the following examples:

EXAMPLE 1

70% by weight of fine grained phosphorus slag, 15% by weight of kaolin and 15% by weight of amorphous silica were intimately mixed. This mixture was moistened in such a manner that after intimate wedging, columner bodies (1 cm diameter); 1 cm height) could be pressed therefrom using a force of 5.8 mkp. After drying for 24 hours, the bodies were introduced in a laboratory oven and then heated slowly to a temperature of 1200° C. This temperature was maintained for 15 minutes. The oven was then switched off and the bodies cooled slowly as the oven cooled.

The resulting bodies were internally and externally white and had a grain density of 2.1 g/cm$^3$ and a compressive resistance of 360 kp/cm$^2$. As crystalline phases merely, the modifications of the mineral wollastonite could be determined by X-ray analysis.

EXAMPLE 2

85% by weight fine grained phosphorus slag and 15% by weight kaolin were intimately mixed and the same procedure followed as in example 1, however a sintering temperature of 1225° C. was utilized.

The resulting bodies were internally and externally white having a grain density of 2.05 g/cm$^3$ and a compressive resistance of 320 kp/cm$^2$. As crystalline phases, beside wollastonite modifications minor quantities of anorthite were also determined by X-ray analysis.

EXAMPLE 3

100 parts by weight of fine grained purified phosphorus slag and 25 parts by weight of amorphous silica were intimately mixed. The same procedure followed as in example 1, however, maximum temperatures of 1200° C. were maintained for a period of 45 minutes.

The resulting bodies were internally and externally white. As crystalline phases, merely wollastonite modifications were determined.

EXAMPLE 4

85% by weight of fine grained purified phosphorus slag and 15% by weight of glassy feldspar were intimately mixed and the same procedure followed as in example 1, however, a maximum temperature of 1000° C. was maintained for a period of 15 minutes.

The resulting bodies were internally and externally white. As crystalline phases, merely wollastonite modifications were determined.

EXAMPLE 5

The raw mixture according to example 3 was intimately mixed with 0.08% by weight Cr$_2$O$_3$ and example 1 procedures followed. The burning was carried out at a maximum temperature of 1200° C. for 15 minutes. Internally and externally green colored bodies were formed.

EXAMPLE 6

The raw mixture according to example 3 was intimately mixed with 0.5% by weight of CoO and example 1 procedures followed. The burning was carried out at a temperature of 1200° C. for 15 minutes.

The resulting bodies had an intensely blue color internally and externally.

The removal of the impurities from the phosphorus slag which was quenched in water is performed by a sorting process. This process can be carried out by means of gravity separation, settling operation, tabling, electro or high voltage magnetic separation or by means of a spiral grader. In addition, the sorting processes can be combined in any sequence and number in order to realize better separation results and may also be combined in an advantageous manner with classifying methods like sifting, screening, or spiral classification thus optimizing the separation effect.

The use of sorting processes for the removal of impurities from the granulated phosphorus slag was by no means self-evident since, after quenching in water, the slag lies in a range lending itself to either coarse or fine grain sorting processes. Surprisingly enough, it appeared that a very high purifying result can be obtained if, for example, the sorting is carried out in aqueous medium.

As compared to other sorting processes, the settling operation is particularly suitable for the separation of the ferrophosphorus-containing grains from the slag which is moist after granulation. In this regard, the use of a settling machine having granulated materials on the settling bottom as settling material carrier has proved to be specially advantageous. The sorting processes for purifying the phosphorus slag are preferably carried out with liquids and the latter are mostly recovered and recirculated. Sorting in gas stream has also proved to be workable. The liquid and gas stream can be either pulsating or continuous.

The ferrophosphorus containing grains are concentrated in heavy material of the settling machine. In case the end loss of slag in the settling machine heavy material is considered to be unsatisfactory, and a metal product of higher concentration is desired, a concentrating step can be provided. Basically, this second step also consists of a second settling machine. Furthermore, the preconcentrated metal product can—after dehydration and drying—be separated to slag grains and metal product by means of electroseparation and thus very pure ferrophosphorus can be obtained.

The concentrated ferrophosphorus present in the waste of the sorting process is not wasted but can be used for the production of alloys which are rich in phosphorus. In addition, products with low percentages can be used as flux in the working of iron ores poor in phosphorus or for increasing the P$_2$O$_5$-content of the Thomas slag. Likewise, the ferrophosphorus can be converted to alkali metal phosphates or phosphate-containing mixed fertilizers by fusing with alkali carbonate or lime.

The purification of the phosphorus slag is explained by the following examples:

EXAMPLE 7

Gravity separation with tetrabromoethane

The unclassified slag which was quenched in water was separated into calcium silicate and impurities by gravity separation with tetrabromoethane. It appeared that this sorting process is so effective and precise that it can be used not only as a preparation process but also to appraise other preparation processes. The sorted enriched produce separated with tetrabromoethane had a grain composition according to Table 1:

Table 1

| Grain size mm | Calcium silicate phase (float product) weight % | ferrophosphorus phase (sink product) weight |
|---|---|---|
| 3 | 3.9 | 16.4 |
| 2.0–3.0 | 11.7 | 28.6 |
| 1.0–2.0 | 44.2 | 42.5 |
| 0.5–1.0 | 31.7 | 8.2 |
| 0.25–0.5 | 7.9 | 4.3 |
| 0.1–0.25 | 0.6 | — |
| 0.0–0.1 | — | — |
| | 100.0 | 100.0 |

The purified slag consisted of 99.77% by weight of calcium silicate phase and 0.23% ferrophosphorus phase. Since the grain composition of both phases as well as that of of the total conglomeration is subject to substantial variations, a purification of the phosphorus slag by sifting or screening cannot be efficiently performed.

EXAMPLE 8

Settling Operation

The unclassified slag was fed into a continuously discharging membrane-settling machine by means of a regulating chute. The jigged material carrier consisted of a sieve so that the coarse part of the grain of the heavy material was directly collected on the jigged material carrier while the fine grained slag was discharged through the sieve and is obtained as so-called hutch product. The results of the settling process are specified in the following Table 2:

Table 2

| | Light material | heavy material | hutch material |
|---|---|---|---|
| Weight % | 90.2 | 7.4 | 2.4 |

The light material was completely free of impurities.

EXAMPLE 9

Tabling

The unpurified phosphorus slag was fed to a bumping table. The separating cut was adjusted in such a manner that practically all metallic grains moved to the heavy material. The results are summarized in Table 3:

Table 3

| | Light material | heavy material |
|---|---|---|
| weight % | 78.7 | 21.3 |

The light material was completely free of undesirable impurities, however, the waste contained a relatively large quantity of utilizable calcium silicate so that if necessary this heavy material can be fed to a subsequently added settling machine.

EXAMPLE 10

Combination settling—electro-separation

The waste (heavy material and hutch material) of example 8 were resubjected to settling under optimal conditions and subsequently, were subjected to electro-separation. The settling had the following result (table 4):

Table 4

| | light material | heavy material | hutch material |
|---|---|---|---|
| weight % | 97.21 | 1.53 | 1.26 |

The subsequent electro-separation of the heavy material and hutch material had the following results after precise separation of the substances (Table 5):

Table 5

| Starting material | Product Separated material | Weight % |
|---|---|---|
| | NL | 1.29 |
| | L | 0.34 |
| heavy material | — | 1.53 |
| | NL | 1.21 |
| | L | 0.05 |
| hutch material | — | 1.26 |
| summary | NL | 2.40 |
| of heavy material | L | 0.39 |
| of hutch material | — | 2.79 |

NL = non-conductor;
L = conductor

The foregoing example shows that a further preparation of the waste is basically possible and it leads to concentrations worth mentioning and purification of the slag free of ferrophosphorus.

If the burned material is to be utilized in the form of lumps, it is expedient to work the starting material. The slag sand can be ground, granulated or briquetted. However, one can avoid the grinding of the hard sand and work it directly in a compacting machine. Finally, it is possible to work the sand after preheating, e.g., at 900° C. by means of which, the compacting becomes possible and easier. In the latter case, the flue gas of the baking oven can be used to preheat the material to be burned. It appeared that one obtains extraordinarily compact material by burning particularly the briquets formed by compacting. The necessary residence time in the burning zone depends on the desired decolorization. It is expedient to burn preferably small briquets the smallest diameter of which should be not more than, e.g., 10 mm. Briquets of such a kind are also inaffected by too rapid cooling.

The wollastonite material prepared according to the invention is particularly suitable as raw material component for ceramic products particularly for the production of wall tiles. One can even dispense with one burning process if the unbaked slag with additives is used and the wollastonite formation and decoloration is transferred to the ceramic baking. Thereby, the slag and hence the ceramic product undergo an increase in volume because the slag becomes a little inflated during the baking. Therefore, the unbaked slag can be advantageously used if an increase in volume is desired for compensating for a usually occuring shrinkage of the body.

With the modified wollastonite material produced according to the process of the invention, a ceramic raw material is, e.g. available which permits substantially simplifying the raw material dressing of ceramic masses and production of ceramic bodies by means of quick burning processes. As is known, ceramic objects consisting mainly of clay and kaolin are produced mostly by adding specific quantities of CaO-component for improving the baking quality and reducing the moisture expansion. However, burned lime, (CaO), limestone (CaCO$_3$), and calcium hydroxide (Ca(OH)$_2$) are not suitable for that purpose so one is dependent on silicate bonded CaO. Therefore, synthetic or natural wollastonite is exclusively used. On the other hand, besides clay and kaolin, ceramic masses usually contain quarz and feldspar so that the following substances are simultaneously present: silicon dioxide and hydrous aluminium silicate. The object of the ceramic burning is to intimately sinter these substances by forming new mineral phases and a predominant portion of glass phase. It is obvious that this process proceeds much simpler and much better if the initial substances are homogenously mixed. However, the homogeniety of the mixture is very much limited by the granulation of the components. Even by the usual incorporation of CaO in a common clay-ceramic mass, in the form of pure natural wollastonite, the homogenous condition of the mixture is further reduced by reason of the granulation. Since in the modified synthetic wollastonite material the above-mentioned components to be incorporated in the ceramic masses are present in an optimum distribution, the difficulties of homogenization can be avoided when using this material.

The wollastonite material produced according to the invention exhibits a high degree of compactness and rough surface and thus is particularly suitable for use as admixed material for building purposes, particularly for normal and sight concrete from organic and inorganic binders. A subsequent treatment, which destroys the surface of the concrete mass can lead to special color effects if the colored, modified wollastonite material is utilized. By reason of its high abrasive resistance the burned product can be used for brightening bituminous pavement in road construction and in combination with suitable organic and inorganic binders for the production of colored traffic lane marking. Besides, white or colored steam hardened calcium silicate building material can be produced from the white or colored product due to its high content of reactive calcium silicates. The wollastonite material satisfies high esthetic requirements when used as decorative graveling for garden paths and flower pots. In the ground state, it is an inert white or colored filler and coloring substance, suitable for plastics, paper and coatings.

We claim:

1. A method for the production of high-brightness synthetic wollastonite material utilizing the slag melt obtained during the thermal production of phosphorus from crude phosphate, said method comprising the steps of
   quenching the melt in water to produce a glassy slag sand,
   removing impurities from the quenched slag, and
   burning the quenched slag at a temperature of about 1100° C. in an oxidizing atmosphere to produce the crystalline wollastonite.

2. A method according to claim 1 characterized by adding to the slag prior to burning Al$_2$O$_3$-containing substances in quantities of 1 to 15% by weight, calculated as Al$_2$O$_3$ and relating to the slag.

3. A method according to claim 1 characterized by adding to the slag prior to burning SiO$_2$-containing substances, in quantities of 2 to 30% by weight, calculated as SiO$_2$ and relating to the slag.

4. A method according to claim 1 characterized by adding to the slag prior to burning calcium oxide containing substances in quantities of 0.5 to 10% by weight, calculated as calcium oxide and relating to the slag.

5. A method according to claim 1 characterized by adding prior to burning substances for coloring ceramic bodies, ceramic glazings, enamels and glasses which are known per se.

6. A method according to claim 1 characterized by carrying out the removal of impurities from the phosphorus slag by means of a sorting process.

7. A method according to claim 6 characterized in that the sorting is carried out by means of a settling process.

8. A method according to claim 1 characterized in that the quenched slag melt is compacted cold prior to burning.

9. A method according to claim 1 characterized in that the quenched slag melt is compacted hot in the course of the burning process.

* * * * *